United States Patent Office 3,234,236
Patented Feb. 8, 1966

3,234,236
METHOD FOR PREPARATION OF ARYLOXY-PROPENE SULFIDES
Manfred Sander and Walter Blöchl, Frankfurt am Main, Germany, assignors, by mesne assignments, to Socony Mobil Oil Company, Inc., New York, N.Y., a corporation of New York
No Drawing. Filed Mar. 6, 1963, Ser. No. 263,104
8 Claims. (Cl. 260—327)

The present invention relates to a novel method for preparation of aryloxypropene sulfides and, more particularly, to preparation of such sulfides by reaction of cholopropene sulfide with an alkali salt of a phenolic hydroxyl group in an aromatic compound containing at least one phenolic hydroxyl group. Still more particularly, the present invention relates to a novel process for preparation of such sulfides by reacting an alkali salt of an appropriate phenolic compound with at least one mole of chloropropene sulfide per alkali equivalent in said alkali salt. In an embodiment, the present invention is directed to preparation of aryloxypropene sulfides of the following formula:

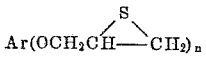

wherein $n$ is an integer of at least one (preferably 1 to 6) and Ar is the aromatic-containing residue of a phenolic compound.

Compounds within the scope of the aforesaid general type containing a thiirane group are capable of participating in a variety of different reactions on the basis of their containing a thiirane group. They have been heretofore proposed, for example, as stabilizers for vinyl chloride polymers and vulcanizers for rubber. A known method for their synthesis involves reacting an appropriate epoxide (aryloxypropeneoxide) with potassium thiocyanate or thiourea but, in general, the reaction products are contaminated with the reactants that are difficult to separate. Thus, purification of the product aryloxypropene-sulfides (except for the lowest member, phenoxypropenesulfide, B.P.$_{0.4}$ 95° C.) by distillation involves relatively high losses, as the thiirane compounds tend to polymerize at required distillation temperatures (above 100° C.). Although fractional crystallization has been proposed as a method of purification, its practicability is limited to products that are crystalline. Still another method proposed for purification of the thiirane compounds prepared by the aforesaid known method is chromatography but use of such a method is generally limited to purification of small quantities of materials.

Analogous to the known synthesis of aryloxypropene-oxides by reaction of phenols with epichlorohydrin in presence of an aqueous alkali solution, the reaction of a phenol with 3-chloropropene-sulfide-1 in the presence of aqueous alkali solution has been found to produce aryl-oxythietanes, rather than the thiirane compounds, as the main reaction product. To the contrary, and as the broad concept underlying the present invention, it has been found that the desired thiirane compounds can be produced by reacting 3-chloropropene- sulfide-1 with an alkali salt of a phenolic compound in a substantially anhydrous reaction medium. In example, and using for purposes of illustration the reaction of a mole to mole ratio of an alkali salt of phenol and 3-chloropropene-sul-fide-1, the desired thiirane compound is produced according to the following equation:

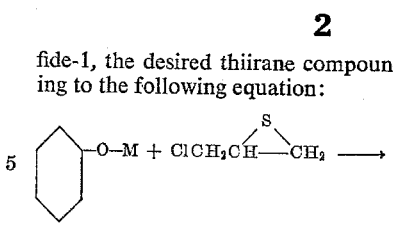

wherein M is an alkali and, for example, an alkali metal such as potassium, sodium, etc.

In further example, embodied herein is the preparation of aryloxypropene sulfide of the formula:

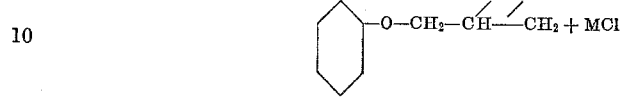

wherein $n$ is an integer of 1 to 6 inclusive, in accordance with the following equation:

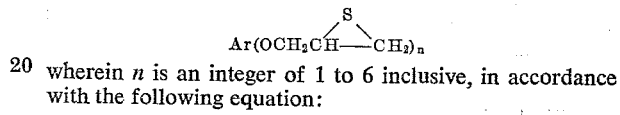

wherein M is an alkali, preferably an alkali metal, and Ar has the aforesaid significane.

In further reference to the reaction medium, i.e., the anhydrous solvent, useful for practice of this invention, it has been found that the yield of the desired thiirane compounds is generally dependent on the particular solvent employed. In illustration, it has been found that, in general, although the desired thiirane compounds are produced when anhydrous solvents are used, including polar and non-polar organic solvents, use of a non-polar organic solvent or a solvent of relatively low polarity results in production of the desired aryloxypropene sulfide but in mixture with aryloxythietane whereas, by use of solvents of increasing higher polarity, the higher is the proportional yield of the desired aryloxypropene sulfide. In contrast, and although water is a solvent of high polarity, no substantial (if any) yield of aryloxypropene sulfides occurs by use of water as the solvent.

In order to illustrate the results obtained by use of different solvents that also differ in polarity, the table set forth hereinafter contains data obtained from a process carried out as embodied herein by reacting 0.1 mole of sodium phenoxide in 25 ml. of the solvent with 0.1 mole of chloropropene sulfide for three hours at 70° C. The resulting reaction mixture was subjected to distillation to distill off the solvent and the residue was then dissolved in ether. The ethereal solution was then extracted three times with aqueous alkali followed by evaporating the ethereal solution and extraction of the residue with petroleum ether. The product that was soluble in petroleum ether, set forth in the table as the crude product, was examined for content of phenoxypropene sulfide by analytical determination of the thiirane groups by the following method.

Approximately 0.1 gram of the sample to be analyzed is dissolved in approximately 20 ml. of glacial acetic acid. If the substance is insoluble in that acid, benzene or chloroform may be added. To the solution, 25 ml. of a 0.1 N solution of iodine in glacial acetic acid is added. After the solution has been left standing in the dark for one hour, it is diluted with approximately 100 ml. of water, starch is added as an indicator and the iodine that is not consumed by the reaction is titrated back with 0.1 N $Na_2S_2O_3$ solution. Two gram-atoms of iodine is consumed by one gram-atom of thiirane sulfur.

For the runs for which data are set forth in the following table, the same conditions were used but it is not intended that such conditions be considered to be optimum for preparation of the phenoxy propene sulfide. Since the proportion of the crude product that is insoluble in petroleum ether consists predominantly of low molecular weight polymers of phenoxypropene sulfide, the quantity of such polymer production is indicative of formation of the thiirane during the reaction. Thus, the proportion of such polymer formation is included in the table.

| Solvent | Dielectric constant | Yield of crude product, percent | The Crude Product Contains— | | |
|---|---|---|---|---|---|
| | | | Phenoxy-propene sulfide, percent | Polymer, percent | Sum of phenoxy-propene sulfide plus polymer, percent |
| Cyclohexane | 2.0 | 50 | 25.5 | 15 | 35.5 |
| Benzene | 2.3 | 34.4 | 22.5 | 19.4 | 41.9 |
| Dibutylether | 3.1 | 35.2 | 30 | 13 | 43 |
| Chlorobenzene | 6.0 | 40.7 | 24.8 | 25 | 49.8 |
| Tetrahydrofuran | 7.6 | 22.1 | 49.2 | 5 | 54.2 |
| Methylethyl ketone | 18.5 | 67.8 | 51.5 | 20.5 | 72.0 |
| Diglycol dimethylether | | 83.6 | 53 | 20 | 73 |
| Acetonitrile | 37.0 | 81 | 42 | 40 | 82 |
| Dimethylforamide | 37.6 | 83.5 | 46.4 | 34.5 | 80.9 |
| Dimethylsulfoxide | 49 | 84.5 | 41.2 | 45 | 86.2 |

As is evident from the data in the table, the sum of the proportion of phenoxysulfide plus polymer that is formed generally increases with increasing polarity of the solvent. Thus, particularly suitable for the preparation of aryloxypropene sulfides by the method embodied herein are solvents of as high polarity as possible (e.g., preferably a dielectric constant above 30) and which are devoid of water and hydroxyl groups. Examples of preferred solvents are aliphatic ethers and polyethers, aliphatic ketones, aliphatic sulfoxides and sulfones, aliphatic nitriles and amides and, as more specific embodiments, organic substances such as acetonitrile, dimethylformamide, dimethyl acetamide, glycol ethers and polyglycol ethers, dimethylsulfoxide, tetramethylene sulfone, and the like. Suitable solvents may be further characterized by being devoid of hydroxyl groups and devoid of a hydrogen atom linked to a nitrogen atom.

In reference to the alkali salt of the phenolic substance useful for reaction with the chloropropene sulfide as embodied herein suitable phenolic substances include phenol and polyhydroxybenzenes, halogenated phenols such as the chlorophenols and bromophenols; nitrophenols, alkyl phenols, alkoxy phenols and, in general, hydroxy aromatic compounds, including hydroxy aromatic compounds that contain substituents inert to reaction with the chloropropene sulfide. Thus, still other phenolic substances that may be used include diphenols, for example, hydroquinone, resorcinol, dihydroxydiphenyl, dihydroxydiphenyl oxide, dihydrodiphenyl sulfide, dihydroxydiphenyl sulfone, dihydroxydiphenyl methane, dihydrodiphenyl propane, dihydroxynaphthalene, phloroglucinol, trihydroxynaphthalenes, tetrahydroxydiphenyls as well as their derivatives which are substituted at the nucleus by halogen, nitro groups, alkyl groups, alkoxy groups, and others.

The process of the present invention can be carried out over a relatively wide range of temperature and, for example, at temperatures below about 20° C. and above about 100° C. However, the desired reaction between the phenolic reactant and the chloropropene sulfide is preferably carried out at from about 20° C. up to about 100° C. as temperatures higher than about 100° C. tend to induce polymerization both of the product aryloxypropene sulfide and the chloropropene sulfide reactant. As the unconverted chloropropene sulfide can be readily removed by distillation and the unconverted phenolic substance by washing with an alkali, it may be expedient in cases where polymerization is to be avoided or substantially minimized to carry out the reaction under mild reaction conditions, such as at low temperature and short reaction times. When polymer formation does occur, the polymer can be readily separated from the monomeric aryloxypropene sulfide by means utilizing their differences in solubility.

In the process embodied herein wherein the chloropropene sulfide is reacted with an alkali salt of the phenolic or substituted phenolic substance to prepare compounds embodied herein, such compounds are the result of reaction of one mole of the chloropropene sulfide per alkali equivalent in the alkali salt. Thus, in carrying out the process embodied herein, the reactants are employed in a ratio of at least one mole of the chloropropene sulfide for each alkali equivalent in the alkali salt.

In order to further describe the invention, several embodiments thereof are set forth for purposes of illustration and not limitation.

*Example 1*

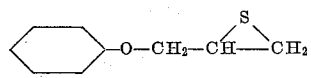

To a solution of 70.8 grams of phenol in 300 milliliters of diethyleneglycol dimethylether (diglyme) 17.3 grams of sodium was added and heated at about 100° C. until all of the sodium was dissolved. To this solution, which was allowed to cool to room temperature, 90 grams of 3-chloropropene-sulfide-1 was added and the solution stirred for 72 hours at room temperature. The quantity of sodium chloride filtered off from the solution corresponded to a conversion of 77%. After the addition of 2.5 liters of water an oil separated which was extracted with chloroform, the chloroform soltuion was washed three times with 5% caustic soda solution, dried over sodium sulfate, and evaporated. The oily residue was distilled in the vacuum. 51.6 grams of liquid distillate (B.P.$_{0.05}$ 82–86° C.) and 28 grams of distillation residue was obtained. On cooling with ice the distillate solidified in crystalline form but melted again at room temperature. By dissolution in petroleum ether and cooling at 0° C. white crystals (M.P. 18.5–19.5° C.) were obtained.

Analysis:
  Thiirane S _____percent__ 19.2
  Total:
    S _____do____ 19.4
    C _____do____ 65.0
    H _____do____ 6.1
  Molecular weight (cryoscopic determination) 164
  Calculated for $C_9H_{10}OS$:
    S _____percent__ 19.3
    C _____do____ 65.1
    H _____do____ 6.0
  Molecular weight _____ 166

Carrying out the reaction for 4 hours at 70° C. gave a conversion of 92%. The reaction furnished 49.8 grams of distillate (B.P.$_{0.05}$ 80–90° C.) and 45.6 grams of distillation residue. The distillate contained 18.4% thiirane sulfur and 19.7% of total sulfur.

*Example 2*

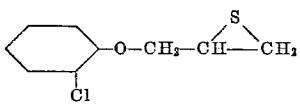

113 grams of sodium salt of o-chlorophenol in 150 milliliters of diglyme was reacted for 3 hours with 81.4 grams of chloropropene sulfide at 70° C. According to the quantity of sodium chloride obtained, the conversion totalled 84.4%. The preponderance of the solvent was distilled off in vacuum, the residue dissolved in chloroform, washed three times with 5% caustic soda solution, washed with water to neutral reaction, dried over sodium sulfate and evaporated.

16 grams of chlorophenol was recovered. The yield of crude product was 125 grams. Distillation of the crude product gave 56.2 grams of liquid distillate (B.P.$_{0.2}$ 125–130° C.) and 59.6 grams of distillation residue. The liquid distillate contained 15.8% of total sulfur, 13.9% thiirane sulfur and 17.5% of chlorine (calculated: 16.0% S, 17.7% Cl).

*Example 3*

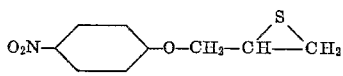

96.5 grams of sodium salt of p-nitrophenol in 150 milliliters of dimethyl sulfoxide was reacted for 3 hours with 65.2 grams of chloropropene sulfide at 70° C. The conversion, determined from the quantity of sodium chloride obtained, amounted to 74%. The solution was concentrated in vacuum, the residue treated with chloroform, washed with alkali and water, dried and evaporated. 88.4 grams of a crystalline crude product was obtained. 12.7 grams of nitrophenol was recovered from the alkaline washing liquor. After two-fold recrystallization from petroleum ether (100–140) the substance melted at 93–94° C.

Analysis: Percent
Total S _____ 15.3
Thiirane S _____ 15.0
Calculated for C$_9$H$_9$NO$_3$S: S, 15.2.

*Example 4*

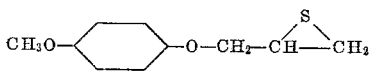

140.2 grams of sodium salt of hydroquinone monomethyl ether in 150 milliliters of diglyme was stirred for 3 hours with 104.2 grams of chloropropene sulfide at 70° C. The mixture was worked up as described in Example 2. The conversion was 92.7%. 135 grams of crude product was obtained which gradually crystallized on storing. After two recrystallizations from petroleum ether (100–140) the substance melted at 67° C.

Analysis: Percent
Total S _____ 16.3
Thiirane S _____ 16.0
Calculated for C$_{10}$H$_{12}$O$_2$S: S, 16.3.

*Example 5*

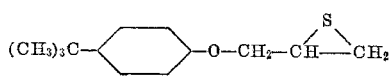

136 grams of sodium salt of p-tert.-butylphenol in 170 milliliters of diglyme was converted within 3 hours with 85.8 grams of chloropropene sulfide at 70° C. The mixture was worked up as described in Example 2. The conversion was 88%. 11.8 grams of tert.-butylphenol was recovered. The yield of crude product amounted to 150.5 grams. This contained 14.2% of thiirane sulfur (calc. 14.4%). Vacuum distillation of the crude product yielded 47.5 grams of distillate (B.P.$_{0.2}$ 122–127° C.) which crystallized on cooling. The crystals melted at 15–17° C.

Analysis: Percent
Total S _____ 14.5
Thiirane S _____ 13.7
Calculated for C$_{13}$H$_{18}$OS: S, 14.4.

*Example 6*

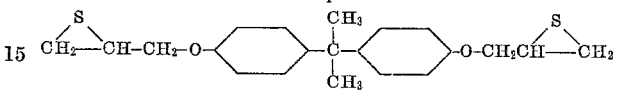

14.6 grams of disodium salt of bisphenol A in 100 milliliters of diglyme was reacted within 6 hours with 14 grams of chloropropene sulfide at 70° C. The resultant precipitate was filtered off and the solution diluted with 500 milliliters of water and extracted three times with chloroform. The chloroform solution was washed three times with 5% caustic soda solution, washed to neutral reaction with water, dried over Na$_2$SO$_4$ and evaporated. 11.4 grams of an oily crystal slurry was obtained which contained 17.1% of total sulfur and 15.7% of thiirane sulfur (calc. 17.2% S). Cryoscopic determination in benzene showd a molecular weight of 370 (cal. 372). By recrystallization from petroleum ether wax-like crystals melting between 84 and 85° C. were obtained.

The same reaction repeated with dimethyl sulfoxide instead of diglyme gave 14 grams of crude product containing 17.4% of total sulfur and 13.5% of thiirane sulfur. Molecular weight: 492.

Compounds containing a thiirane group, such as produced by the method of this invention, are useful as stabilizers for polymeric substances (e.g., polyvinyl chloride), and as plasticizers and cross-linking agents for plastics and rubber.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A method for the preparation of an aryloxypropene sulfide which comprises reacting a substantially anhydrous mixture containing 3-chloropropene sulfide, an alkali salt having the formula Ar(OM)$_n$ wherein $n$ is an integer of at least one, M is an alkali metal and Ar is the residue of an aromatic compound containing at least one phenolic hydroxyl group, and an inert liquid organic solvent having a dielectric constant of at least about 18.5, said reaction being carried out with the use of a ratio of at least about one mole of the chloropropene sulfide per alkali equivalent in said salt.

2. A method, as defined in claim 1, in which the solvent is selected from the group consisting of methylethyl ketone, diethyleneglycol dimethylether, acetonitrile, dimethylformamide and dimethyl sulfoxide.

3. A method, as defined in claim 1, wherein the reaction is carried out at from about 20 to about 100° C.

4. A method, as defined in claim 1, wherein the solvent is a polar organic liquid compound having a dielectric constant of above 30.

5. A method, as defined in claim 1, wherein $n$ is an integer of 1 to 6, inclusive.

6. A method, as defined in claim 1, wherein the alkali salt has the following formula:

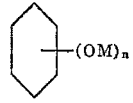

wherein M is an alkali metal and $n$ is an integer of 1 to 6, inclusive.

7. A method, as defined in claim 1, wherein the alkali salt is a sodium salt.

8. A process, as defined in claim 1, wherein the alkali salt is an alkali metal salt of a phenolic compound selected from the group consisting of chlorophenol, nitrophenol, alkoxy phenol, and alkyl phenol.

References Cited by the Examiner

UNITED STATES PATENTS 2,943,096  6/1960  Reinking _____ 260—348
2,949,474  8/1960  Murdoch _____ 260—348

WALTER A. MODANCE, *Primary Examiner.*

NICHOLAS S. RIZZO, *Examiner.*

UNITED STATES PATENT OFFICE
CERTIFICATE OF CORRECTION

Patent No. 3,234,236                          February 8, 1966

Manfred Sander et al.

It is hereby certified that error appears in the above numbered patent requiring correction and that the said Letters Patent should read as corrected below.

Column 1, line 13, for "cholo-" read -- chloro- --; column 2, lines 9 to 13, the formula should appear as shown below instead of as in the patent:

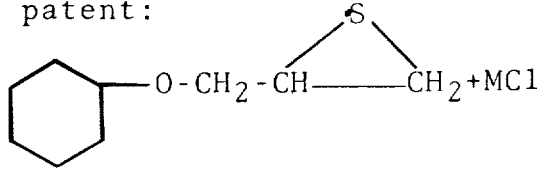

Signed and sealed this 10th day of January 1967.

(SEAL)
Attest:

ERNEST W. SWIDER                                    EDWARD J. BRENNER
Attesting Officer                                           Commissioner of Patents